(12) United States Patent
Mukul (10) Patent No.: US 11,159,733 B2
(45) Date of Patent: Oct. 26, 2021

(54) ACCESSIBLE REMOTE DEPOSIT CAPTURE

(71) Applicant: MX Technologies, Inc., Lehi, UT (US)

(72) Inventor: Saumya Mukul, Lehi, UT (US)

(73) Assignee: MX Technologies, Inc., Lehi, UT (US)

( * ) Notice: Subject to any disclaimer, the term of this patent is extended or adjusted under 35 U.S.C. 154(b) by 0 days.

(21) Appl. No.: 16/830,156

(22) Filed: Mar. 25, 2020

(65) Prior Publication Data

US 2020/0314346 A1  Oct. 1, 2020

Related U.S. Application Data

(60) Provisional application No. 62/823,651, filed on Mar. 25, 2019.

(51) Int. Cl.
| | | |
|---|---|---|
| *H04N 5/232* | (2006.01) | |
| *G06N 20/00* | (2019.01) | |
| *G06Q 10/10* | (2012.01) | |
| *G06F 3/01* | (2006.01) | |
| *G06F 9/451* | (2018.01) | |
| *G06F 3/16* | (2006.01) | |
| *G06K 9/00* | (2006.01) | |
| *G06Q 20/10* | (2012.01) | |

(52) U.S. Cl.
CPC ......... *H04N 5/23299* (2018.08); *G06F 3/016* (2013.01); *G06F 3/167* (2013.01); *G06F 9/453* (2018.02); *G06K 9/00463* (2013.01); *G06N 20/00* (2019.01); *G06Q 10/10* (2013.01); *G06Q 20/108* (2013.01)

(58) Field of Classification Search
CPC ..... H04N 5/23299; G06F 9/453; G06F 3/016; G06F 3/167; G06N 20/00; G06K 9/00463; G06Q 10/10; G06Q 20/108
See application file for complete search history.

(56) References Cited

U.S. PATENT DOCUMENTS 9,569,756 B1 * 2/2017 Bueche, Jr. ............ G06K 9/186
2006/0024647 A1   2/2006 Chesnais et al.
(Continued)

OTHER PUBLICATIONS

International Application No. PCT/US20/24750, "Notification of Transmittal of the International Search Report and the Written Opinion of the International Searching Authority, or the Declaration", dated Jun. 17, 2020, pp. 1-9.

*Primary Examiner* — Jonathan R Messmore
(74) *Attorney, Agent, or Firm* — Kunzler Bean & Adamson, PC (57) ABSTRACT

Apparatuses, methods, program products, and systems are disclosed for accessible remote deposit capture. An apparatus includes a position module that determines a position of a hardware device relative to a document based on input captured from a camera of the hardware device. An apparatus includes a direction module that determines one or more directions for moving a hardware device relative to a document to position the document within a predefined area of a field of view of a camera. An apparatus includes an accessibility module that provides accessibility feedback via a hardware device based on determined one or more directions. Accessibility feedback includes feedback for assisting a user that has a visual impairment with positioning a hardware device such that a document is within a predefined area of a field of view of a camera.

20 Claims, 6 Drawing Sheets

(56) References Cited

U.S. PATENT DOCUMENTS

| | | | | |
|---|---|---|---|---|
| 2014/0267663 | A1* | 9/2014 | Yasukawa | G06K 9/00771 |
| | | | | 348/77 |
| 2016/0166930 | A1* | 6/2016 | Brav | G08B 21/02 |
| | | | | 463/30 |
| 2017/0344339 | A1* | 11/2017 | Molesky | G06F 3/167 |
| 2017/0364154 | A1* | 12/2017 | Levesque | G02B 27/017 |

* cited by examiner

ACCESSIBLE REMOTE DEPOSIT CAPTURE

CROSS-REFERENCES TO RELATED APPLICATIONS

This application claims the benefit of U.S. Provisional Patent Application No. 62/823,651 entitled "ACCESSIBLE REMOTE DEPOSIT CAPTURE" and filed on Mar. 25, 2019, for Saumya Mukul.

FIELD

This invention relates to remote deposit capture and more particularly relates to accessibility features for remote deposit capture.

BACKGROUND

Mobile applications and other computer program products simplify the lives of many people. For example, a user may perform banking and other functions on their phone that previously required a trip to a physical branch. However, if one of these functions requires use of a camera or other visual interaction, the function may become difficult or impossible for the visually impaired to use.

SUMMARY

Apparatuses, methods, program products, and systems are disclosed for accessible remote deposit capture. An apparatus, in one embodiment, includes a position module that determines a position of a hardware device relative to a document based on input captured from a camera of the hardware device. An apparatus, in further embodiments, includes a direction module that determines one or more directions for moving a hardware device relative to a document to position the document within a predefined area of a field of view of a camera. An apparatus, in certain embodiments, includes an accessibility module that provides accessibility feedback via a hardware device based on determined one or more directions. Accessibility feedback may include feedback for assisting a user that has a visual impairment with positioning a hardware device such that a document is within a predefined area of a field of view of a camera.

A method, in one embodiment, includes determining a position of a hardware device relative to a document based on input captured from a camera of the hardware device. A method, in further embodiments, includes determining one or more directions for moving a hardware device relative to a document to position the document within a predefined area of a field of view of a camera. A method, in some embodiments, includes providing accessibility feedback via a hardware device based on determined one or more directions. Accessibility feedback may include feedback for assisting a user that has a visual impairment with positioning a hardware device such that a document is within a predefined area of a field of view of a camera.

An apparatus, in some embodiments, includes means for determining a position of a hardware device relative to a document based on input captured from a camera of the hardware device. An apparatus, in various embodiments, includes means for determining one or more directions for moving a hardware device relative to a document to position the document within a predefined area of a field of view of a camera. An apparatus, in certain embodiments, includes means for providing accessibility feedback via a hardware device based on determined one or more directions. Accessibility feedback may include feedback for assisting a user that has a visual impairment with positioning a hardware device such that a document is within a predefined area of a field of view of a camera.

Systems are presented for accessible remote deposit capture to perform one or more of the operations described with regard to the disclosed methods and apparatuses. Computer program products comprising a computer readable storage medium are presented. In certain embodiments, a computer readable storage medium stores computer usable program code executable to perform one or more of the operations described with regard to the disclosed methods and apparatuses.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
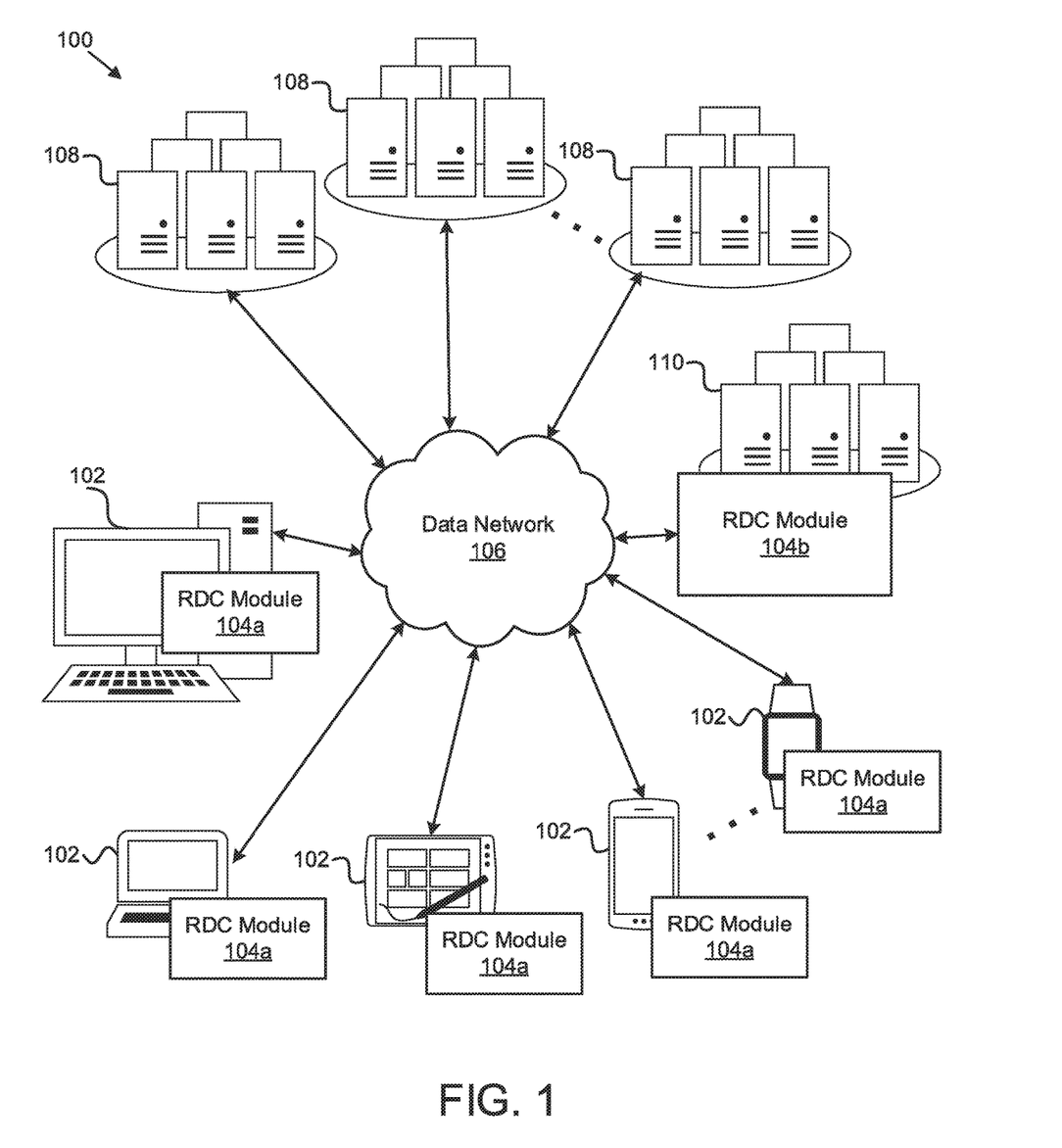
FIG. 1 is a schematic block diagram illustrating one embodiment of a system for accessible remote deposit capture.

FIG. 1 depicts one embodiment of a system 100 for accessible remote deposit capture. In one embodiment, the system 100 includes one or more hardware devices 102, one or more RDC modules 104 (e.g., a backend RDC module 104b and/or a plurality of RDC modules 104a disposed on the one or more hardware devices 102), one or more data networks 106 or other communication channels, one or more third party service providers 108 (e.g., one or more servers 108 of one or more service providers 108; one or more cloud or network service providers, or the like), and/or one or more backend servers 110. In certain embodiments, even though a specific number of hardware devices 102, RDC modules 104, data networks 106, third party service providers 108, and/or backend servers 110 are depicted in FIG. 1, one of skill in the art will recognize, in light of this disclosure, that any number of hardware devices 102, RDC modules 104, data networks 106, third party service providers 108, and/or backend servers 110 may be included in the system 100.

In one embodiment, the system 100 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more third party service providers 108 and/or one or more backend servers 110 via a data network 106, described below. The hardware devices 102, in a further embodiment, are capable of executing various programs, program code, applications, instructions, functions, or the like.

In one embodiment, the RDC module 104 is configured to aid users who have visual or other impairments use a mobile device to digital capture and submit documents such as checks, loan applications, job applications, and/or other forms. In certain embodiments, the RDC module 104 is configured to determine a position of a hardware device relative to a document based on input captured from a camera of the hardware device, determine one or more directions for moving the hardware device relative to the document to position the document within a predefined area of a field of view of the camera, and provide accessibility feedback via the hardware device based on the determined one or more directions for assisting a user that has a visual impairment with positioning the hardware device such that the document is within the predefined area of the field of view of the camera. The RDC module 104 is described in more detail below with reference to FIG. 3.

In various embodiments, an RDC module 104 may be embodied as hardware, software, or some combination of hardware and software. In one embodiment, an RDC module 104 may comprise executable program code stored on a non-transitory computer readable storage medium for execution on a processor of a hardware device 102, a backend server 110, or the like. For example, an RDC module 104 may be embodied as executable program code executing on one or more of a hardware device 102, a backend server 110, a combination of one or more of the foregoing, or the like. In such an embodiment, the various modules that perform the operations of an RDC module 104, as described below, may be located on a hardware device 102, a backend server 110, a combination of the two, and/or the like.

In various embodiments, an RDC module 104 may be embodied as a hardware appliance that can be installed or deployed on a backend server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, an RDC module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of an RDC module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to an RDC module 104.

An RDC module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, an RDC module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of an RDC module 104.

The semiconductor integrated circuit device or other hardware appliance of an RDC module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of an RDC module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third party service providers 108, in one embodiment, may include one or more network accessible computing systems such as one or more web servers hosting one or more web sites, a database server, an enterprise intranet system, an application server, an application programming interface (API) server, an authentication server, or the like. The one or more third party service providers 108 may include systems related to various institutions or organizations. For example, a third party service provider 108 may include a system providing electronic access to a financial institution, a university, a government agency, a utility company, an email provider, a social media site, a photo sharing site, a video sharing site, a data storage site, a medical provider, or another entity that stores data associated with a user. In one embodiment, a third-party service provider 108 comprises a remote deposit capture service provider that provides a pass/fail interface for remotely depositing checks into deposit accounts for users over the data network 106.

In certain embodiments a third-party service provider 108 may allow users to create user accounts to upload, view, create, and/or modify data associated with the user. Accordingly, a third-party service provider 108 may include an authorization system, such as a login element or page of a web site, application, or similar front-end, where a user can provide credentials, such as a username/password combination, an account number and PIN, or the like to access the user's data.

Figure 2:
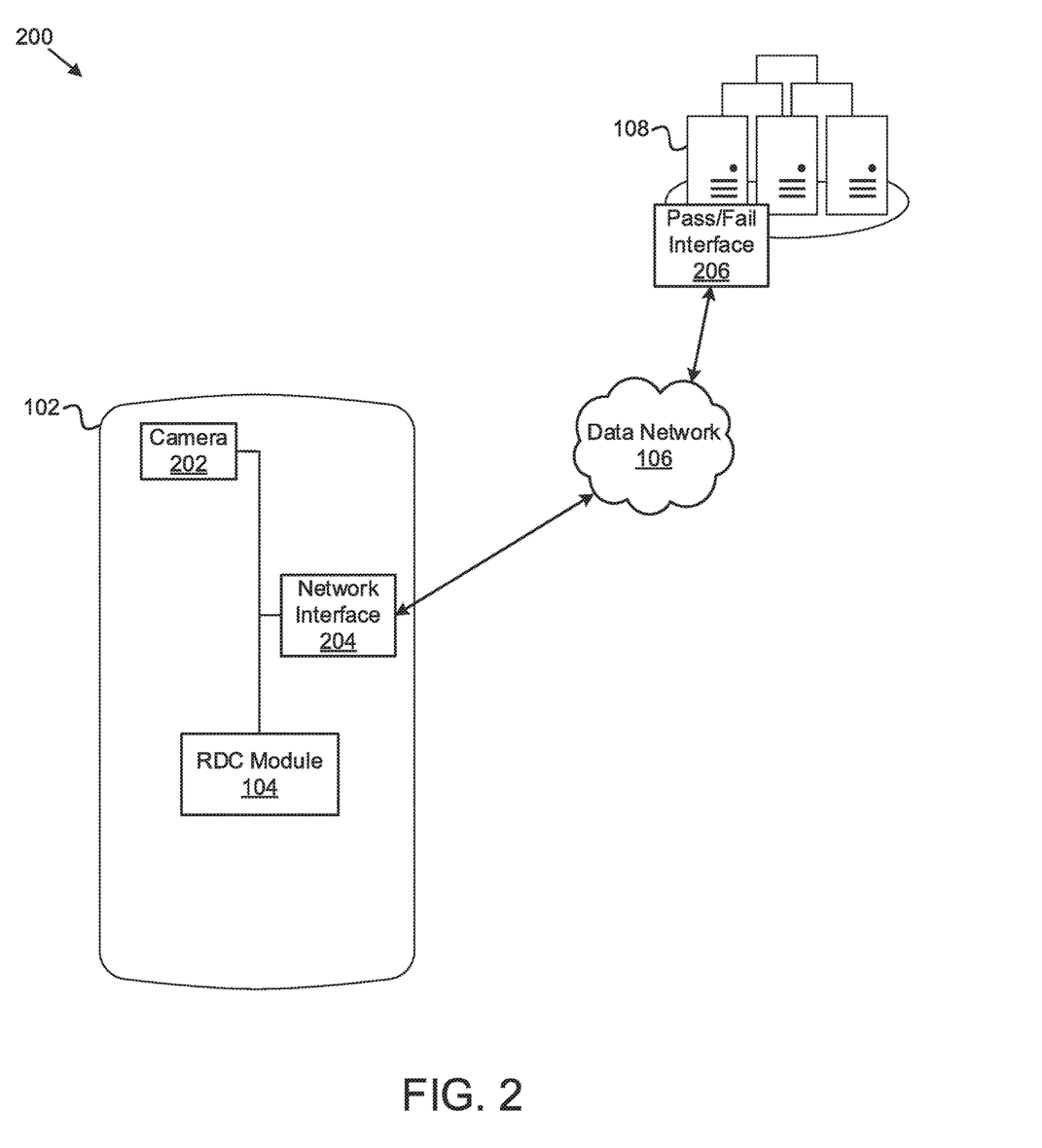
FIG. 2 is a schematic block diagram illustrating a further embodiment of a system for accessible remote deposit capture.

FIG. 2 depicts one embodiment of a system 200 for accessible remote deposit capture. In the depicted embodiment, the system 200 includes a mobile computing device 102, a data network 106, and a third-party server 108. The mobile computing device 102, the data network 106, and the third-party server 108, in certain embodiments, may be substantially similar to one or more of the computing devices 102, the data network 106, and/or the third-party servers 108 described above with regard to FIG. 1. The mobile computing device 102, in the depicted embodiment, includes a camera 202, a network interface 204, and an RDC module 104. The third-party server 108, in the depicted embodiment, includes a pass/fail interface 206.

A camera 202, in certain embodiments, may comprise a front facing camera, a world facing camera, a read facing camera, or the like of the mobile computing device 102. A user, in certain embodiments, may use a camera 202 of the mobile computing device 102 to take one or more images and/or photos. For example, as part of a remote deposit capture process for depositing a check over the data network 106, the RDC module 104 may prompt a user to take an image/photo of the check using the camera 202 (e.g., an image/photo of the front of the check, an image/photo of the back of the check, or the like). In some embodiments, a camera 202 may comprise a digital camera and the RDC module 104 may store one or more images/photos from the camera 202 in volatile memory and/or non-volatile storage of the mobile computing device 102 (e.g., for submission to the pass/fail interface 206 over the data network 106 using the network interface 204, or the like).

A network interface 204, in certain embodiments, may comprise a wireless transmitter and receiver, transceiver, and/or modem (e.g., for radio frequency, cellular communications, code-division multiple access or other spread spectrum, time division multiple access, Bluetooth®, Wi-Fi®, NFC, and/or other wireless communications). In other embodiments, the network interface 204 may comprise a wired network interface (e.g., a USB interface, an ethernet interface, a serial port, or the like). The network interface 204, in one embodiment, enables digital communication with other devices (e.g., with a backend server 110, a third-party server 108, another computing device 102, or the like) over the data network 106.

An RDC module 104, in certain embodiments, may use the network interface 204 to send electronic submissions over the data network 106 to the pass/fail interface 206. A pass/fail interface 206, in certain embodiments, comprises a network interface configured to selectively receive or reject (e.g., pass or fail) electronic submissions. For example, a pass/fail interface 206 may comprise a query language interface of a database system that rejects or otherwise refuses to execute a query with improper formatting or may comprise a remote deposit capture interface that either accepts a check for deposit or rejects it remotely based on one or more submitted images/photos of the check.

In certain embodiments, a pass/fail interface 206 may charge a fee, enforce a quota, or the like against a user or other entity associated with an electronic submission whether the pass/fail interface accepts or rejects the electronic submission. As described above, the RDC module 104 may determine a likelihood that an electronic submission will be accepted by the pass/fail interface 206 prior to submitting the electronic submission, and may perform one or more corrective actions on the electronic submission in response to determining that the electronic submission is unlikely to be accepted by the pass/fail interface 206 (e.g., the determined likelihood fails to satisfy a threshold, or the like).

In one embodiment an RDC module 104 sends an electronic submission from a mobile computing device 102 to a pass/fail interface 206 of a third-party service provider 108. In a further embodiment, an RDC module 104 sends an electronic submission from a mobile computing device 102 to a backend RDC module 104 of a backend server 110, and the backend RDC module 104 of the backend server 110 may send the electronic submission to the pass/fail interface 206 of the third-party service provider 108.

In various embodiments, the RDC module 104 may use one or more machine learning and/or artificial intelligence functions (e.g., learned functions or the like) to generate one or more propensity models. A propensity model may comprise machine learning, artificial intelligence, a statistical and/or mathematical function, a decision tree, a ruleset, and/or another type of model indicating a likelihood (e.g., predicting) and/or propensity of input data to have and/or yield one or more outcomes. For example, a propensity model may be generated to determine a likelihood or propensity of various types of input data to pass and/or fail when submitted to a pass/fail application programming interface (API) or other function (e.g., a query interface such as a structured query language (SQL) interface, or the like), so that the RDC module 104 may save the cost of submitting data likely to fail to the pass/fail API, may correct data likely to fail before submitting it to the pass/fail API, may request an action of a user to correct data likely to fail, or the like.

Examples of pass/fail APIs, in various embodiments, include a remote deposit capture (RDC) API for depositing checks remotely (e.g., using a camera of a computing device 102 or the like) that either accepts (e.g., passes) or rejects (e.g., fails) one or more images of an uploaded check; a loan application interface that either approves (e.g., passes) or denies (e.g., fails) a loan request in response to submission of a loan application; a diagnostic and/or inspection interface for an electrical and/or mechanical device (e.g., a computing device 102, an automobile or other vehicle that yields a pass and/or fail result; a database interface that either accepts/executes a submitted query or rejects/throws an error; and/or another interface that accepts/rejects, passes/fails, approves/denies, or otherwise provides a binary or two state result.

In some embodiments, where a pass/fail API comprises an RDC API, an RDC module 104 may provide one or more accessibility features, described in more detail below with reference to FIG. 3. For example, in certain embodiments, an RDC module 104 may provide one or more voice prompts to a user, may provide haptic feedback to a user, or the like, to assist a user who may have a disability, such as being blind or otherwise visually impaired.

An RDC module 104, in one embodiment, may train machine learning and/or other artificial intelligence to estimate or otherwise determine a likelihood that an electronic submission to a pass/fail interface will be accepted and/or be rejected by submitting electronic submissions to the pass/fail interface and observing and/or learning from the results over time with different submissions. Machine learning and/or other artificial intelligence, in various embodiments, may include supervised learning (e.g., classification and/or numerical regression, or the like), unsupervised learning, another learned function that improves through experience, clustering, dimensionality reduction, structured prediction, anomaly detection, neural networks (e.g., artificial neural networks, a deep convolutional neural network, or the like), reinforcement learning, decision tree learning, association rule learning, deep learning, inductive logic programming, support vector machines, Bayesian networks, representation learning, similarity and/or metric learning, sparse dictionary learning, genetic algorithms, rule-based machine learning, learning classifier systems, or the like.

For example, in one embodiment, an RDC module 104 may comprise a neural network, such as a deep convolutional neural network, based propensity model trained on previous submissions to a pass/fail interface, which may filter an image/photo multiple times, apply a pixel matrix multiplication and black and white filters, resulting in a value intensity image weighted based on the training of the neural network, or the like, and may determine a likelihood that an electronic submission (e.g., one or more images) will be accepted by a pass/fail interface based on the resulting weighted value intensity images.

In one embodiment, an RDC module 104 may determine one or more pass rates, fail rates, or the like for different inputs, types of inputs, or the like to a pass/fail interface. By learning the behavior of a pass/fail interface, in certain embodiments, an RDC module 104 may mimic or clone one or more functions of an interface locally (e.g., on a hardware device 102), to provide an indication of whether or not data will pass or fail an interface of a third party service provider

108 without submitting the data to the third party service provider 108 (e.g., a remote server 108 or other remote device 108). For example, if each submission to an interface of a third-party service provider 108 incurs a cost or is counted against a quota, an RDC module 104 may reduce incurred costs due to failures by either blocking submission of data likely to fail, correcting data likely to fail, or the like. Determining a likelihood that an electronic submission will pass or fail locally on a hardware computing device 102, in certain embodiments, may be faster than submitting the electronic submission to a pass/fail interface on a remote server 108 of a third-party service provider 108, regardless of whether there is a cost associated with the submission.

In certain embodiments, a control RDC module 104*b*, or the like, may train machine learning or another artificial intelligence model on an interface to generate a propensity model, and may provide the generated propensity model to one or more device RDC modules 104*a* on different hardware devices 104*a* for different users, to dynamically monitor, adjust, and/or correct requests to an interface (e.g., a pass/fail interface of a third party service provider 108, or the like). An RDC module 104 may train a propensity model on actual requests to an interface (e.g., based on data from one or more users), or on training data (e.g., previously received and/or submitted data, artificially created data, or the like).

A propensity model of an RDC module 104, in certain embodiments, may determine when to perform a corrective action on an electronic submission such as suggesting and/or requesting additional information and/or additional action from a user (e.g., missing data, incomplete data, incorrect data, or the like), automatically correcting one or more characteristics of the electronic submission, and/or performing a different corrective action. A corrective action, in one embodiment, according to a trained propensity model, may be an action that increases a likelihood that an electronic submission will be accepted and/or passed by a pass/fail interface (e.g., may change a failed request to a passing request, or the like).

In the RDC example described above, in certain embodiments, a corrective action may comprise retaking one or more images/photos of a check (e.g., at a different angle, with a different background to avoid white on white, with a less complex background, with a different focal length and/or focus to decrease blurriness, swapping incorrectly labeled front and back images/photos, rotating an image/photo, or the like), requesting the user re-enter and/or correct an amount of the check (e.g., based on optical character recognition of a handwritten amount on the check failing to match an amount entered by a user), adding information to an electronic submission, adding a signature to an electronic submission, adding required text (e.g., "for mobile deposit only") to an electronic submission, or the like.

In various embodiments, a propensity model may determine that a money order will fail (e.g., will be rejected by a pass/fail RDC interface for depositing checks), that a blurry or improperly focused image of a check will fail, that an image of a check with a complex background and/or field of capture will fail, that an upside down image of a check will fail, two images of a front or back of a check instead of one of each will fail, an image of a white check on a white background will fail, that a check that is not signed for endorsement will fail, that a check with an amount that doesn't match a user provided amount will fail, or the like.

In certain embodiments, an RDC module 104 may request that a user take an image/photo of a check first, prior to entering information about the check (e.g., a monetary amount or the like), so that the RDC module 104 may determine and suggest the information to the user (e.g., to reduce the possibility of the user entering the wrong information). For example, an RDC module 104 may use optical character recognition to determine an amount for a check and may suggest the determined amount to the user as an option the user may select instead of entering an amount manually.

In the loan application example, in certain embodiments, a propensity model may indicate that an application is likely to be rejected with certain information missing, and an RDC module 104 may request the missing information from a user before submitting the loan application, to avoid and/or reduce a chance of the application being rejected.

For certain predicted failures, an RDC module 104 may correct the electronic submission automatically with little or no input or corrective action from a user. For example, an RDC module 104 may flip an upside-down image, may rotate and/or adjust a rotation of (e.g., de-skew) an image, or the like without requiring a user to retake the image (e.g., correcting the image on the same device 102 the image was taken, prior to submitting the image to a pass/fail interface of a third party service provider 108 or other remote server 108).

In one embodiment, at least an initial pass or determination by an RDC module 104 may comprise an image recognition function with no feature extraction. For example, an RDC module 104 may determine "is the image/photo of a check" without attempting to extract additional information from the check, such as an amount, a routing number, an account number, a check number, a date, or the like. Such a determination may be fast and capable of being performed on any of the hardware devices 102. An RDC module 104, in response to predicting and/or otherwise determining that an image/photo is not of a check, may prompt and/or alert a user that the image/photo does not contain a check, request that a user retake an image/photo, or the like.

An RDC module 104, in some embodiments, may provide an override interface (e.g., a graphical user interface button or the like), allowing a user to submit an electronic submission to a pass/fail interface even if the RDC module 104 has determined that the electronic submission is likely to fail. In other embodiments, an RDC module 104 may block electronic submissions from a pass/fail interface that the RDC module 104 predicts are likely to fail, without the possibility of overriding (e.g., but may suggest and/or perform one or more corrective actions until the RDC module 104 predicts the electronic submission will be acceptable to the pass/fail interface, or the like).

In one embodiment, an RDC module 104 may comprise and/or use multiple tiers of machine learning and/or artificial intelligence, such as multiple series of artificial neural networks, series of series of artificial neural networks, or the like (e.g., with the output of one tier as an input into another tier, or the like). An RDC module 104, in certain embodiments, may dynamically determine which tiers to use to process data, an order for selected tiers, or the like. For example, an RDC module 104 may select and/or order tiers based on a priority or hierarchy, such as by speed (e.g., fastest to slowest or vice versa, only tiers above a speed threshold, or the like), breadth (e.g., broadest to narrowest or vice versa, only tiers above or below a threshold, or the like), or another characteristic. Each tier (e.g., artificial neural network) may perform a different determination (e.g., in the RDC example, one may locate a rectangle, one may determine if the check is upside down, one may determine if the image is blurry, one may locate the amount, or the like).

In one embodiment, an RDC module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third party service providers 108. The RDC module 104, in certain embodiments, accesses a server 108 of a third party service provider 108 using a user's electronic credentials to make an electronic submission to a pass/fail interface of the third party service provider 108, to download data associated with the user from the third party service provider 108, such as a user's photos, a user's social media posts, a user's medical records, a user's financial transaction records or other financial data, and/or other data associated with and/or owned by a user but stored by a server 108 of a third party service provider 108 (e.g., stored by hardware not owned, maintained, and/or controlled by the user). The RDC module 104, in various embodiments, may provide downloaded data to the user locally (e.g., displaying the data on an electronic display of a hardware device 102); may provide the downloaded data from the hardware device 102 of the user to and/or package the data for a remote server 110 (e.g., a backend RDC module 104b) or other remote device (e.g., another hardware device 102 of the user, a hardware device 102 of a different user, or the like) which may be unaffiliated with the third party service provider 108; may provide one or more alerts, messages, advertisements, or other communications to the user (e.g., on a hardware device 102) based on the downloaded data; or the like.

In one embodiment, at least a portion of an RDC module 104 may be integrated with or otherwise part of another application executing on a hardware device 102, such as an online banking application and/or a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a database client, a photo viewer, a medical application, an insurance application, an accounting application, a social media application, or the like, which may use data the RDC module 104 downloads from a server 108 of a third party service provider 108.

Figure 3:
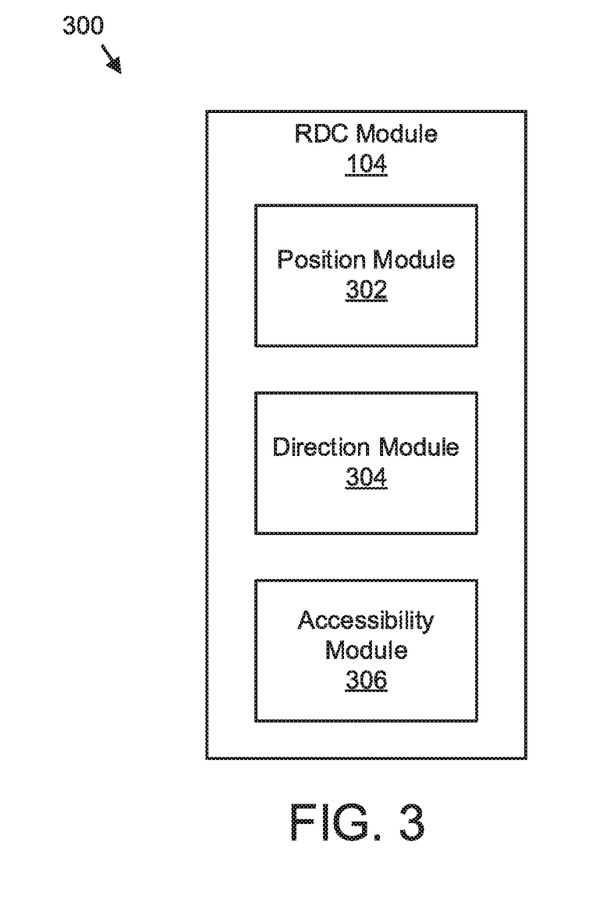
FIG. 3 is a schematic block diagram illustrating one embodiment of a module for accessible remote deposit capture.

FIG. 3 depicts one embodiment of a module 300 for accessible remote deposit capture. In one embodiment, the module 300 includes an instance of an RDC module 104. In certain embodiments, the RDC module 104 includes a position module 302, a direction module 304, and an accessibility module 306, which are described in more detail below.

The position module 302, in one embodiment, is configured to determine a position of a hardware device 102 relative to a document based on input captured from a camera 202 of the hardware device 102. As described above, the camera 202 may be a front-facing or world-facing camera of a mobile device such as a smart phone or tablet computing device. The position module 302 may determine a position of the hardware device 102, or more particularly a position of the camera 202, relative to a document in order to position the document within a field of view of the camera 202 so that the document is visible within a viewing window on the hardware device's display.

Accordingly, an image or video of the document may be captured and uploaded, saved, stored, shared, transmitted, or otherwise provided or made accessible to a third-party such as a bank or other financial institution, a social media network, an online job board, and/or the like. Thus, the document may be a financial document such as a check, loan application, or the like that is associated with a financial institution, a job application or resume that is being uploaded to an online job board, legal documents, documents for archiving, or other documents that the user wishes to capture an image or video of. Other items, in addition to documents, may be the subject of the image capture including 3D objects, e.g., items to post on an online auction site.

The position module 302 may use images or videos captured using the front-facing camera to determine the hardware device's position relative to the document. For instance, the position module 302 may capture images using the camera 202 and analyze the images using image processing techniques, e.g., edge detection, text recognition, and/or the like to identify portions of the document such as edges, corners, or the like, and to determine a current position of the hardware device 102 relative to the document or to the identified portions of the document. In some embodiments, the position module 302 uses other sensors such as proximity sensors, motion sensors, infrared sensors, and/or the like to determine the hardware device's position relative to the document such as a distance from the document, a position in space relative to the document, an orientation of the hardware device 102, and/or the like.

The direction module 304, in one embodiment, is configured to determine one or more directions for moving the hardware device relative to the document to position the document within a predefined area of a field of view of the camera 202. Based on the position of the hardware device 102 relative to the document that the position module 302 determines, the direction module 304, in one embodiment, determines how the hardware device 102 needs to move to place the document within a field of view of the camera 202, and more particularly, within a predefined area of the field of view of the camera 202.

For instance, in one embodiment, the one or more directions for moving the hardware device 102 include body relative directions, which, as used herein, include geometric orientations relative to a body such as a hardware device 102. Examples of body relative directions include left, right, forward, backward, up, down, or the like. In further embodiments, the one or more directions may include orientation directions such as a tilt, angular position, and/or the like of the hardware device 102.

In certain embodiments, the position module 302 may not detect a document or item that is visible to the camera 202, and therefore is not within a field of view of the camera 202. For instance, the position module 302 may not detect a document within images that are captured using the camera 202. In such an embodiment, the direction module 304 may indicate that directions can't be determined because the document or object is not detected and may instruct the user to move or orient the hardware device 102 so that the document or object is visible on the hardware device's display.

The accessibility module 306, in one embodiment, is configured to provide accessibility feedback via the hardware device 102 based on the determined one or more directions. The accessibility feedback, as used herein, may include feedback for assisting a user that has a visual impairment (such as vision loss due to blindness, blurred vision, blind spots, generalized haze, extreme light sensitivity, or the like) or other disability, with positioning the hardware device 102 relative to the document, based on the one or more directions that the direction module 304 determines, such that the document is within the predefined area of the field of view of the camera 202.

In some embodiments, as the hardware device 102 is moved, the position module 302 updates the determined position of the hardware device 102 relative to the document, and the direction module 304 updates the directions that the hardware device 102 needs to move to place the document within the predefined area of the field of view of the camera 202. Accordingly, the accessibility module 306 provides accessibility feedback based on the updated directions that the direction module 304 determines for the hardware device 102.

In one embodiment, the accessibility feedback includes voice commands that are emitted from the hardware device 102, e.g., from a speaker or headphones, that instruct the user to move the hardware device 102 in the one or more directions that the direction module 304 determines. For instance, the accessibility module 306, in one embodiment, may audibly prompt, command, direct, or instruct a user how to align the hardware device 102 and/or the camera 202 thereof relative to the document to be photographed using the directions that the direction module 304 determines.

For example, the accessibility module 306 may provide an audible voice prompt or command from a speaker of the hardware device 102, from headphones and/or a headset in communication with the computing device 102, or the like. The accessibility module 306 may audibly inform a user which edges and/or corners of a document the accessibility module 306 detects in an image and/or video feed from the camera 202, which edges and/or corners of a document are missing in an image and/or video feed from the camera 202, or the like. For example, the accessibility module 306 may provide audible directions or statuses such as "no edges found," "top edge found," "bottom edge found," "left edge found," "right edge found," "top edge missing," "bottom edge missing," "left edge missing," "right edge missing," and/or the like.

In a further embodiment, the accessibility module 306 may provide one or more audible voice commands to a user that provide a specific direction to move the hardware device 102, e.g., "move right," "move left," "move toward the top," "move toward the bottom," "move closer to the check," "move further from the check," "hold the device steady," or the like based on a detected position of a document in an image and/or video from a camera 202 of a hardware device 102, or the like.

In some embodiments, the position module 302 and/or the direction module 304 may determine or estimate a distance that the hardware device 102 needs to move to position an edge or corner of the document within the predefined area of the field of view of the camera 202, e.g., based on image processing analyses of images captured of the document using the camera 202 and a position of the camera 202/hardware device 102, and may provide the distances audibly to the user. For example, the voice command may be "move right two inches," "move away three inches," "move one inch closer," and/or the like.

In further embodiments, the accessibility module 306 may determine and/or provide one or more other voice prompts and/or commands, based on an image and/or video feed from a camera 202 for a hardware device 102 and/or based on one or more other sensors of a hardware device 102 such as light sensors, proximity sensors, motion sensors, infrared sensors, or the like (e.g., a voice prompt/command to increase lighting such as "turn on the lights" or the like, a voice prompt/command to change an orientation and/or rotation of a hardware device 102 such as "flip over the device" and/or "rotate the device", and/or another voice prompt/command).

The accessibility module 306, in some embodiments, may use an interface of a hardware device 102 and/or of computer executable code executing on a hardware device 102 (e.g., a device and/or operating system API, library, or the like) to provide one or more audible voice messages, prompts, and/or commands to a user. For example, an accessibility module 306 may use VoiceOver screen reader and/or an AVSpeechSynthesizer class and/or interface of an Apple® hardware device 102, a TalkBack screen reader of a Google® Android® hardware device 102, or the like.

In one embodiment, the accessibility feedback comprises haptic feedback generated by one or more sensors of the hardware device 102. Haptic feedback, as used herein, may refer to creating an experience of touch by applying forces, vibrations, ultrasounds, air vortex rings, or other motions to a user. For instance, the accessibility feedback may include vibrations, forces, or the like that are generated by motors, actuators, or the like of the hardware device 102.

In one embodiment, the accessibility module 306 generates haptic feedback for one or more portions of the hardware device 102 to indicate to the user to move the hardware device 102 in a direction that the direction module 304 determines. For instance, to indicate that the hardware device 102 needs to move to the right, the accessibility module 306 may trigger a motor to vibrate on the right side, edge, or portion of the hardware device 102. In another example, to indicate that the hardware device 102 needs to move up and to the left, the accessibility module 306 may trigger a motor to vibrate the top and the left side, edge, or portion of the hardware device 102 and/or may trigger a motor to vibrate the top left corner of the hardware device 102.

In one embodiment, the accessibility module 306 generates haptic feedback for one or more portions of the hardware device 102 to indicate to the user that a portion of the document is in a correct location within the predefined area of the field of view of the camera associated with the haptic feedback. For instance, the accessibility module 306 may trigger a motor to vibrate a certain number of times, for a certain length of time, in a certain pattern, and/or the like in response to an edge, side, or corner of the document being in a correct position within the predefined field of view of the camera. For example, the accessibility module 306 may trigger a motor in the bottom right hand side to vibrate twice when the corresponding corner of the document is in the correct position.

In one embodiment, the accessibility feedback comprises one or more audible tones generated by the hardware device 102. The audible tones may include a beep or other noise/signal that the accessibility module 306 generates via a speaker, headphones, or other output device of the hardware device 102. In one embodiment, the accessibility module 306 generates one or more audible tones indicate to the user to move the hardware device 102 in a certain direction. For instance, the accessibility module 306 may associate a different tone or beep with each side and/or corner of the hardware device 102 such that a particular tone or beep indicates to the user to move the hardware device 102 in the direction indicated by the particular tone or beep. For example, the accessibility module 306 may associate a certain tone with the right side of the hardware device 102 and a different tone with the left side of the hardware device 102 such that if the direction module 304 indicates that the hardware device 102 needs to move to the right, the accessibility module 306 triggers the tone associated with the right side of the hardware device 102 to indicate to the user that the hardware device 102 needs to move to the right.

In one embodiment, the accessibility module 306 generates one or more audible tones to indicate to the user that a portion of the document is in a correct location within the predefined area of the field of view of the camera 202. For example, as the user moves the hardware device to the right, the accessibility module 306 may generate a tone when a side or corner of the document is in correct location within the predefined area of the field of view of the camera 202. In further embodiments, each side and/or corner of the document may be associated with a different tone so that the user can identify when a particular side or corner of the document is within the predefined area of the field of view of the camera 202.

In embodiments where the accessibility module 306 provides haptic feedback and/or a beep or other noise as audible feedback, the accessibility module 306 may increase a frequency at which the haptic feedback and/or beep or other noise is provided as the hardware device 102 approaches alignment with a document (e.g., as a view from a camera 202 of the hardware device 102 approaches an edge and/or corner, or the like) and/or may become constant in response to alignment being reached (e.g., a constant vibration and/or beep or other sound in response to the accessibility module 306 detecting a targeted edge and/or corner, alignment with a targeted edge and/or corner, or the like). In other words, the accessibility module 306 sets a frequency with which haptic feedback and/or audible tone feedback is generated as a function of a distance between a portion of the document, e.g., an edge or corner, and a corresponding portion of the predefined area of the field of view of the camera 202.

Moreover, the accessibility module 306 may provide accessibility feedback that indicates a speed with which to move the hardware device 102, e.g., slower beeps indicate slower movements, and/or a distance to move the hardware device 102, e.g., a length of a vibration indicates a distance to move the hardware device 102 in a certain direction, e.g., left/right, up/down, to position a portion of the document within the field of view of the camera 202 of the hardware device 102.

In certain embodiments, the accessibility module 306 may determine and/or estimate a distance of a hardware device 102 and/or a camera 202 associated with a hardware device 102 from a document being captured—the distance between the document and the hardware device 102—(e.g., based on a size of the document in an image and/or video feed from the camera 202, using triangulation based on known and/or expected sizes and/or locations of objects detected on the document (such as a payor line on a check), and/or the like). The accessibility module 306, for example, may use a determined and/or estimated distance in order to determine a voice prompt and/or command for a direction to move the hardware device 102 for a user (e.g., "move closer to the check," "move further from the check," or the like).

In one embodiment, a combination of voice commands, haptic feedback, and audible tone feedback may be used to help direct a user with a visual impairment to align a document within a predefined area of the field of view of the camera 202. For example, as a user holds a hardware device 102 and/or an associated camera 202 over a document such as a check, for remote deposit capture, and moves the hardware device 102 and/or associated camera 202 relative to the check based on audible voice prompts and/or commands, the accessibility module 306 may provide haptic and/or audible tone feedback to the user to assist the user in positioning the hardware device 102 in a correct position relative to the check. In such an embodiment, the accessibility module 306 may cause a hardware device 102 to vibrate, beep, and/or provide other haptic feedback, in response to the accessibility module 306 detecting an edge and/or corner of a check in an image and/or video feed from a camera of the computing device 102 (e.g., alerting the user to stop movement of the computing device 102 or the like in response to the haptic feedback indicating that a missing edge and/or corner has been detected, or the like).

In this manner, in certain embodiments, the accessibility module 306 may dynamically indicate to a user to stop and/or slow movement of a hardware device 102 in response to determining alignment of the hardware device 102 with a document (e.g., at least in a direction of movement) such that the accessibility module 306 may capture an image of the document, direct the user to move the hardware device 102 in a second direction, or the like. For example, providing haptic feedback may allow a user to respond more quickly than would an audible voice prompt and/or command, which may be longer and/or take a user longer to interpret than a vibration, beep, and/or other haptic feedback.

In one embodiment, the accessibility module 306 sets a timer when the hardware device 102 stops moving such that the voice commands, prompts, directions, statuses, or the like, the haptic feedback, the audible tone feedback, and/or other accessibility feedback are not provided until the timer expires indicating that the hardware device 102 is not actively moving and is generally in a stationary position. In this manner, the accessibility module 306 is not continuously or constantly providing accessibility feedback while the user is moving the hardware device 102 in an attempt to place the hardware device 102 in position to capture an image of a document. For example, the accessibility module 306 may wait a second, less than a second, or the like after detecting that movement of the hardware device 102 has generally ceased to provide accessibility feedback.

In further embodiments, the accessibility module 306 provides periodic feedback while the hardware device 102 is moving instead of waiting for the hardware device 102 to stop. For instance, the accessibility module 306 may provide feedback every half second, every second, every couple seconds, and/or the like, to help guide the user to move the hardware device 102 into an acceptable position for capturing an image of the document within the predefined field of view of the camera 202.

In one embodiment, the accessibility module 306 provides accessibility feedback indicating that the document is in an acceptable position within the predefined area of the field of view of the camera 202. For example, once the document is determined to be within the boundaries of the predefined area of the field of view of the camera 202, the accessibility module 306 may provide a voice command that says "stay still," "hold still," or the like, and/or may provide one or more beeps and/or may provide haptic feedback to indicate to the user that the hardware device 102 is in a correct position relative to the document so that an image of the document can be captured, e.g., for remote deposit.

In one embodiment, the accessibility module 306 is further configured to adjust one or more camera settings for the camera 202 based on the position of the hardware device 102 relative to the document and one or more environmental conditions where the hardware device 102 is located. The environmental conditions may include a brightness or light level where the hardware device 102 is located, or the like. The camera settings may include a brightness level, a contrast setting, aperture settings, focus settings, zoom settings, exposure settings, color levels, filter settings, and/or the like. The accessibility module 306 may automatically adjust or modify the camera settings based on input from various sensors of the hardware device 102 such as light sensors, proximity sensors, infrared sensors, and/or the like.

In certain embodiments, the accessibility module 306 is communicatively coupled to one or more environment devices associated with the one or more environmental conditions where the hardware device is located. The environment devices may include Internet of Things devices, smart devices, and/or the like. For example, the accessibility module 306 may be communicatively coupled to a smart light, a smart outlet, smart blinds, and/or other smart home devices. In such an embodiment, the accessibility module 306 is further configured to modify one or more settings of the environment devices to adjust the one or more environmental conditions. For instance, the accessibility module 306 may dynamically and automatically turn on/off and/or adjust a lighting level of a light fixture where the hardware device 102 is located, may open/close smart blinds to let in more or less light, and/or the like without requiring the user to manually change, modify, or adjust the environment conditions. The accessibility module 306 may provide voice feedback to indicate to the user what settings of which smart devices were adjusted.

As described above, the document may comprise a financial document such as a check or loan application that is associated with a financial institution such as a bank. Accordingly, the financial institution may provide a mobile application for providing a remote deposit or submission feature for uploading an image capture of the document. In such an embodiment, the camera 202 may be activated or enabled in response to the mobile application being executed on the hardware device 102. Furthermore, in certain embodiments, the predefined area of the field of view of the camera 202 is defined by the mobile application provided by the financial institution to comply with the remote capture requirements of the financial institution.

Figure 4A:
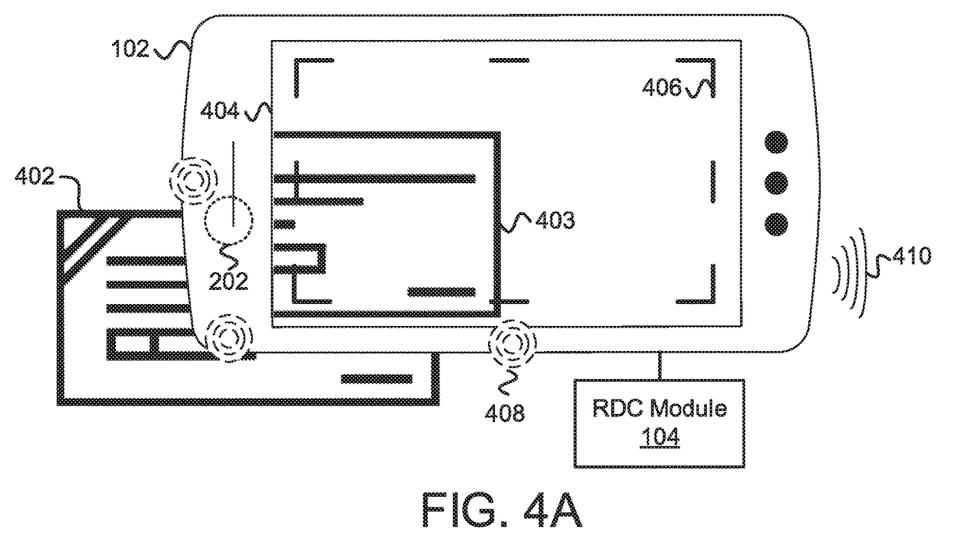
FIG. 4A depicts an example embodiment of a system for accessible remote deposit capture.
Figure 4B:
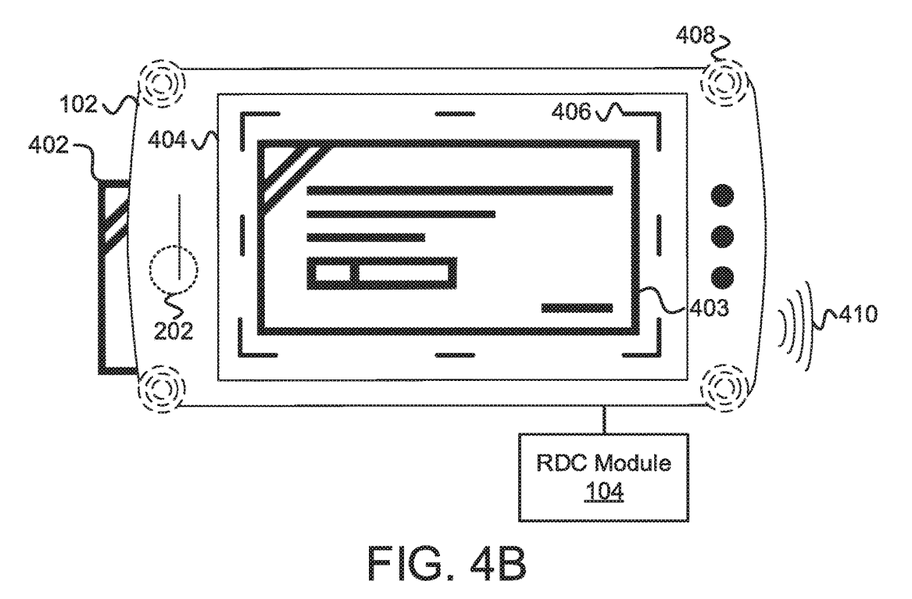
FIG. 4B depicts another example embodiment of a system for accessible remote deposit capture.

FIGS. 4A and 4B depict an example embodiment of a remote deposit capture of a document, in this case a check 402. In FIG. 4A, as a hardware device 102 such as a smart phone is moved over the check 402, images of the check 402 are captured using the camera 202. The position module 302 may use the images to determine the position of the hardware device 102 relative to the check 402 and the direction module 304 may use the determined position to determine directions to provide to a user for moving the hardware device 102 to place an image of the check 403 within a predefined area 406 of the display 404 of the hardware device 102.

The accessibility module 306, based on the determined directions, may provide accessibility feedback to assist the user to move the hardware device 102 in one or more directions such as haptic feedback 408 using vibrations or other forces at specific portions of the hardware device 102 that indicate a direction in which to move the hardware device 102, in this case back towards the user's body and towards the left relative the user's body. In further embodiments, the accessibility module 306 may provide voice commands, instructions, or prompts, and/or audible tones such as beeps to provide directional information to the user for moving the hardware device 102 such that the image of the check 403 is within the boundaries of the predefined area 406 of the display 404 of the camera's field of view.

FIG. 4B depicts a scenario where the user has successfully positioned the hardware device 102 such that the image of the check 403 is located within the predefined area 406 of the display 404. In such an embodiment, the accessibility module 306 may provide haptic, voice, and/or audible tone feedback to indicate that the hardware device 102 is in a correct or acceptable position relative to the check 402 such that an image of the check 403 can be captured and submitted for remote deposit online at a financial institution.

Figure 5:
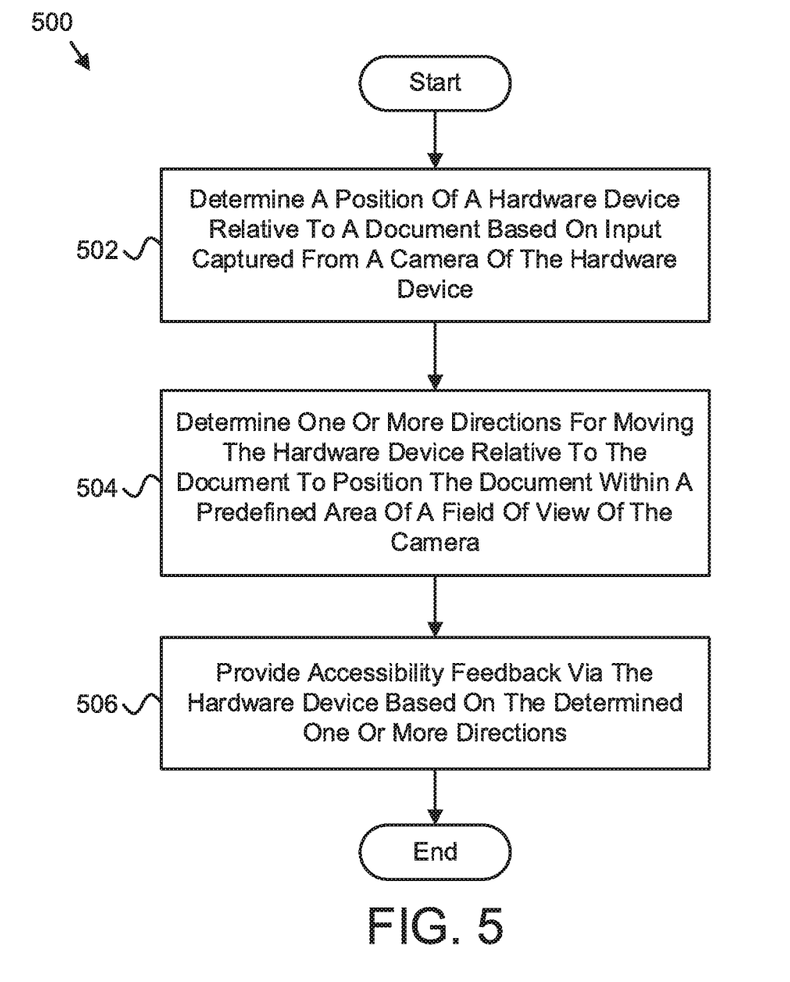
FIG. 5 is a schematic flow chart diagram illustrating an embodiment of a method for accessible remote deposit capture.

FIG. 5 depicts one embodiment of a method 500 for accessible remote deposit capture. The method 500 begins, and a position module 302 determines 502 a position of a hardware device 102 relative to a document based on input captured from a camera 202 of the hardware device 102. A direction module 304, in some embodiments, determines 504 one or more directions for moving the hardware device 102 relative to the document to position the document within a predefined area of a field of view of the camera 202. An accessibility module 306, in certain embodiments, provides 506 accessibility feedback via the hardware device 102 based on the determined one or more directions, and the method 500 ends.

Figure 6:
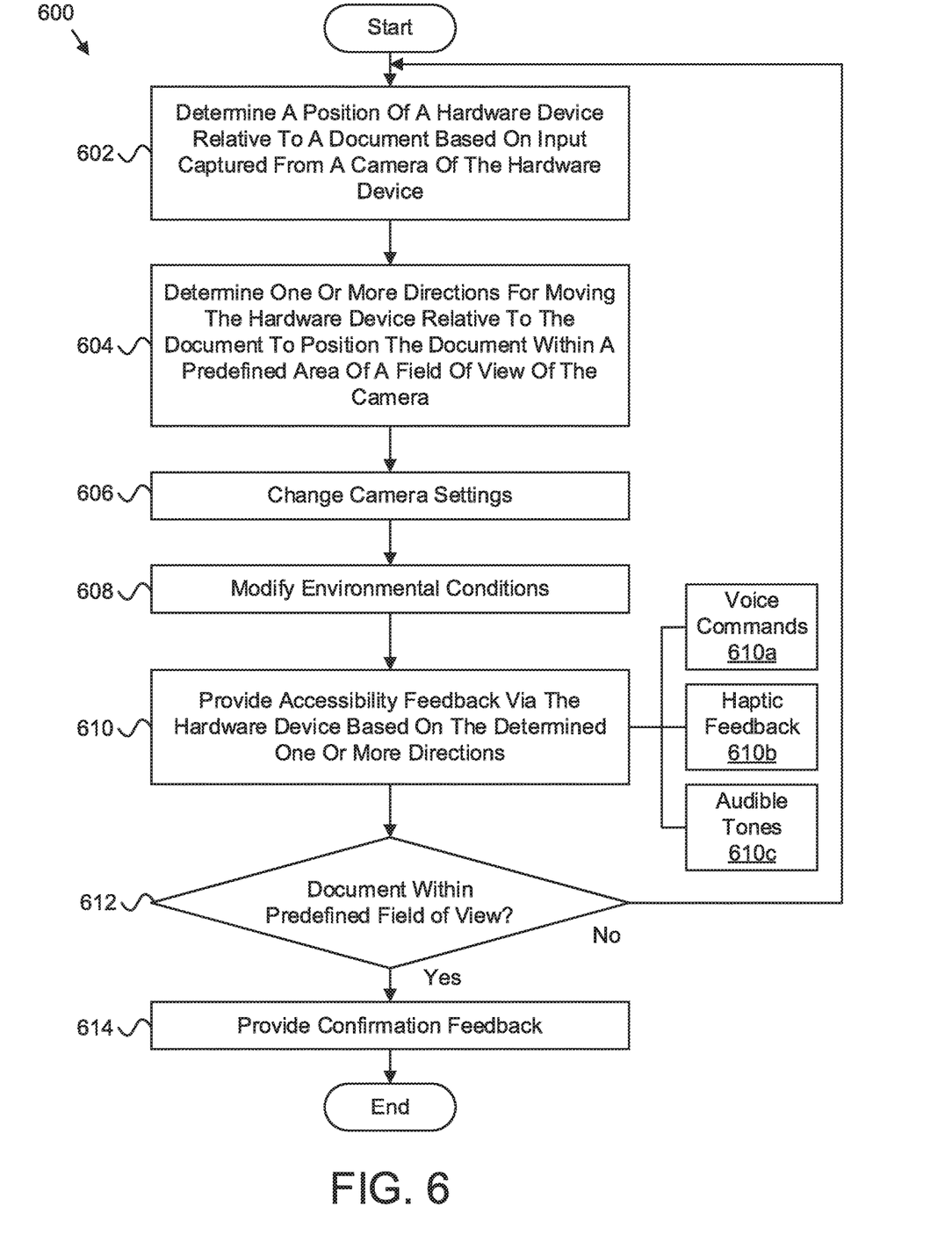
FIG. 6 is a schematic flow chart diagram illustrating another embodiment of a method for accessible remote deposit capture.

FIG. 6 depicts one embodiment of a method 600 for accessible remote deposit capture. The method 600 begins and a position module 302 determines 602 a position of a hardware device 102 relative to a document based on input captured from a camera 202 of the hardware device 102. A direction module 304, in some embodiments, determines 604 one or more directions for moving the hardware device 102 relative to the document to position the document within a predefined area of a field of view of the camera 202.

In further embodiments, an accessibility module 306 changes 606, automatically and dynamically, one or more camera settings of the camera 202 and/or modifies 608, automatically and dynamically, one or more environmental conditions such as lighting levels, brightness, or the like. In further embodiments, the accessibility module 306 provides 610 accessibility feedback via the hardware device 102 based on the determined one or more directions. The accessibility feedback may include voice commands 610a, haptic feedback 610b, audible tones 610c, and/or any combination of the foregoing.

The position module 302, in one embodiment, determines 612 whether the document is within the predefined area of the field of view of the camera 202. If not, the position module 302 continues to determine 602 the position of the hardware device 102 relative to the document. Otherwise, the accessibility module 306 provides 614 confirmation feedback, e.g., voice confirmation, haptic confirmation, and/or audible beep confirmation that indicates that the hardware device 102 is in an acceptable position relative to the document such that the document is within a predefined area of a field of view of the camera 202, and the method 600 ends.

A means for determining a position of a hardware device 102 relative to a document based on input captured from a camera 202 of the hardware device 102, in various embodiments, may include an RDC module 104, a position module 302, a hardware device 102, a processor, an FPGA, an ASIC, other logic hardware, and/or other executable code stored on a computer readable storage medium. Other embodiments may include similar or equivalent means for determining a position of a hardware device 102 relative to a document based on input captured from a camera 202 of the hardware device 102.

A means for determining one or more directions for moving the hardware device 102 relative to the document to position the document within a predefined area of a field of view of the camera 202, in various embodiments, may include an RDC module 104, a direction module 304, a hardware device 102, a processor, an FPGA, an ASIC, other logic hardware, and/or other executable code stored on a computer readable storage medium. Other embodiments may include similar or equivalent means for determining one or more directions for moving the hardware device 102 relative to the document to position the document within a predefined area of a field of view of the camera 202.

A means for providing accessibility feedback via the hardware device 102 based on the determined one or more directions, in various embodiments, may include an RDC module 104, an accessibility module 306, a hardware device 102, a processor, an FPGA, an ASIC, other logic hardware, and/or other executable code stored on a computer readable storage medium. Other embodiments may include similar or equivalent means for providing accessibility feedback via the hardware device 102 based on the determined one or more directions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a position module that is configured to determine a position of a hardware device relative to a document based on input captured from a camera of the hardware device;
   a direction module that is configured to determine one or more directions for moving the hardware device relative to the document to position the document within a predefined area of a field of view of the camera; and
   an accessibility module that is configured to provide accessibility feedback via the hardware device based on the determined one or more directions, the accessibility feedback comprising feedback for assisting a user that has a visual impairment with positioning the hardware device such that the document is within the predefined area of the field of view of the camera, the accessibility feedback provided at an increasing frequency at at least one of an edge and a corner of the hardware device as a corresponding at least one of an edge and a corner of the predefined area of the field of view of the camera approaches alignment with a corresponding at least one of an edge and a corner of the document and becomes constant in response to alignment being reached.

2. The apparatus of claim 1, wherein the one or more directions for moving the hardware device comprises one or more of body relative directions and orientation directions.

3. The apparatus of claim 1, wherein the accessibility feedback comprises one or more voice commands emitted from the hardware device that instruct the user to move the hardware device in the one or more directions.

4. The apparatus of claim 1, wherein the accessibility feedback comprises haptic feedback generated by one or more sensors of the hardware device, the haptic feedback generated for one or more portions of the hardware device to indicate to the user one of:
   to move the hardware device in a direction of the one or more directions associated with the haptic feedback; and
   that a portion of the document is in a correct location within the predefined area of the field of view of the camera associated with the haptic feedback.

5. The apparatus of claim 4, wherein the one or more portions of the hardware device comprises one or more of an edge of the hardware device and a corner of the hardware device.

6. The apparatus of claim 1, wherein the accessibility feedback comprises one or more audible tones generated by the hardware device, the one or more audible tones generated to indicate to the user one of:
   to move the hardware device in a direction of the one or more directions associated with the one or more audible tones; and
   that a portion of the document is in a correct location within the predefined area of the field of view of the camera associated with the one or more audible tones.

7. The apparatus of claim 6, wherein the one or more audible tones comprises different tones each for a different portion of the hardware device, the different portions of the hardware device comprising one or more of an edge of the hardware device and a corner of the hardware device.

8. The apparatus of claim 6, wherein a frequency with which the one or more audible tones is generated is determined as a function of a distance between a portion of the document and a corresponding portion of the predefined area of the field of view of the camera.

9. The apparatus of claim 1, wherein the accessibility module provides accessibility feedback indicating the document is an acceptable position within the predefined area of the field of view of the camera.

10. The apparatus of claim 1, wherein the accessibility feedback further indicates one or more of a speed and a distance for the user to move the hardware device relative to the document.

11. The apparatus of claim 1, wherein the accessibility module is further configured to adjust one or more camera settings for the camera based on the position of the hardware device relative to the document and one or more environmental conditions where the hardware device is located.

12. The apparatus of claim 11, wherein the accessibility module is communicatively coupled to one or more environment devices associated with the one or more environmental conditions where the hardware device is located and is further configured to modify one or more settings of the environment devices to adjust the one or more environmental conditions.

13. The apparatus of claim 1, wherein the document comprises a financial document associated with a financial institution.

14. The apparatus of claim 13, wherein the camera is enabled in response to a mobile document submission function of a mobile application provided by the financial institution being executed on the hardware device.

15. The apparatus of claim 14, wherein the predefined area of the field of view of the camera is defined by the mobile application provided by the financial institution.

16. A method, comprising:
   determining a position of a hardware device relative to a document based on input captured from a camera of the hardware device;

determining one or more directions for moving the hardware device relative to the document to position the document within a predefined area of a field of view of the camera; and providing accessibility feedback via the hardware device based on the determined one or more directions, the accessibility feedback comprising feedback for assisting a user that has a visual impairment with positioning the hardware device such that the document is within the predefined area of the field of view of the camera, the accessibility feedback provided at an increasing frequency at at least one of an edge and a corner of the hardware device as a corresponding at least one of an edge and a corner of the predefined area of the field of view of the camera approaches alignment with a corresponding at least one of an edge and a corner of the document and becomes constant in response to alignment being reached.

17. The method of claim 16, wherein the one or more directions for moving the hardware device comprises one or more of body relative directions and orientation directions.

18. The method of claim 16, wherein the accessibility feedback comprises one or more voice commands emitted from the hardware device that instruct the user to move the hardware device in the one or more directions.

19. The method of claim 16, wherein the accessibility feedback comprises haptic feedback generated by one or more sensors of the hardware device, the haptic feedback generated for one or more portions of the hardware device to indicate to the user one of:

to move the hardware device in a direction of the one or more directions associated with the haptic feedback; and that a portion of the document is in a correct location within the predefined area of the field of view of the camera associated with the haptic feedback.

20. An apparatus, comprising:

means for determining a position of a hardware device relative to a document based on input captured from a camera of the hardware device;

means for determining one or more directions for moving the hardware device relative to the document to position the document within a predefined area of a field of view of the camera;

means for providing accessibility feedback via the hardware device based on the determined one or more directions, the accessibility feedback comprising feedback for assisting a user that has a visual impairment with positioning the hardware device such that the document is within the predefined area of the field of view of the camera, the accessibility feedback provided at an increasing frequency at at least one of an edge and a corner of the hardware device as a corresponding at least one of an edge and a corner of the predefined area of the field of view of the camera approaches alignment with a corresponding at least one of an edge and a corner of the document and becomes constant in response to alignment being reached.

* * * * *